United States Patent [19]
Walter et al.

[11] Patent Number: 5,499,680
[45] Date of Patent: Mar. 19, 1996

[54] DIVERTER, DIVERTER RETRIEVING AND RUNNING TOOL AND METHOD FOR RUNNING AND RETRIEVING A DIVERTER

[75] Inventors: Jeffrey S. Walter, Duncan, Okla.; John C. Gano, Carrollton, Tex.; Desmond Jones, Duncan, Okla.

[73] Assignee: Halliburton Company, Houston, Tex.

[21] Appl. No.: 380,899

[22] Filed: Jan. 30, 1995

Related U.S. Application Data

[63] Continuation-in-part of Ser. No. 296,941, Aug. 26, 1994.

[51] Int. Cl.$^6$ .................................................. E21B 33/10
[52] U.S. Cl. ........................................ 166/377; 166/117.6
[58] Field of Search ............................... 166/117.6, 377, 166/381, 384

[56] References Cited

U.S. PATENT DOCUMENTS

| | | | |
|---|---|---|---|
| 2,331,293 | 10/1943 | Ballard | 255/1.6 |
| 2,362,529 | 11/1944 | Barrett et al. | 166/117.6 X |
| 4,420,049 | 12/1983 | Holbert | 175/45 |
| 5,163,522 | 11/1992 | Eaten et al. | 166/117.6 X |
| 5,193,620 | 3/1993 | Braddick | 166/117.6 X |
| 5,353,876 | 10/1994 | Carington et al. | 166/50 X |

OTHER PUBLICATIONS

Holbert, D. R., "New Interest in Drainhole Drilling Revives Technology", *World Oil*, Mar. 1981, pp. 57–72.

*Primary Examiner*—William P. Neuder
*Attorney, Agent, or Firm*—William M. Imwalle; David H. Hitt

[57] ABSTRACT

A diverter for a subterranean well, a diverter retrieving tool and methods of diverting objects traversing the well and retrieving the diverter. The diverter comprises: (1) a body having a lower portion adapted to be coupled to a diverter anchoring structure and an upper portion having a slanted diverting surface, the diverter adapted to be placed within a main borehole of the subterranean well at a predetermined location and orientation proximate a junction of a lateral borehole with the main borehole, the slanted diverting surface adapted to redirect an object having a particular diameter and coming into contact with the diverter into the lateral borehole and (2) a compliant spring member associated with the slanted diverter surface. The spring member is resiliently retractable toward the slanted diverter surface to allow the object to traverse the junction and enter the lateral borehole, the diverter therefore dynamically adjustable to compensate for an insufficient minimum diameter of a selectable one of the main borehole, junction and lateral borehole. The diverter is configured to receive a flexible finger of the retrieving tool into a central longitudinal shaft therein to engage and retrieve the diverter without having to orient the retrieving tool.

40 Claims, 3 Drawing Sheets

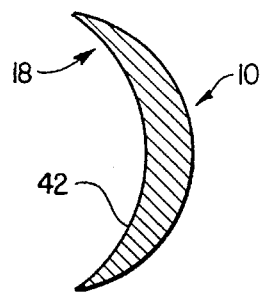
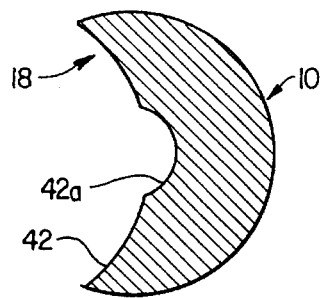
FIG. 1A   FIG. 1B
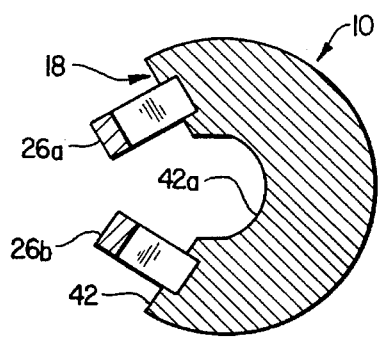
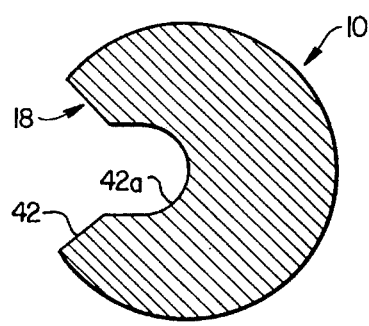
FIG. 1C   FIG. 1D
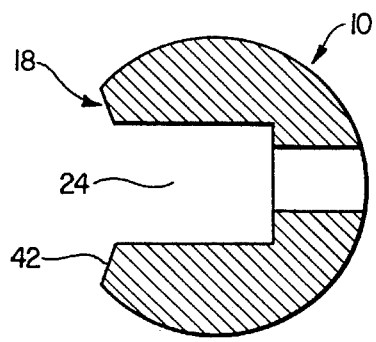
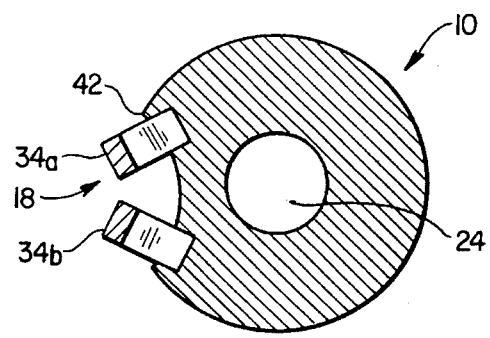
FIG. 1E   FIG. 1F
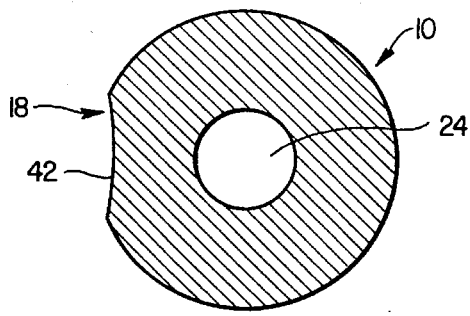
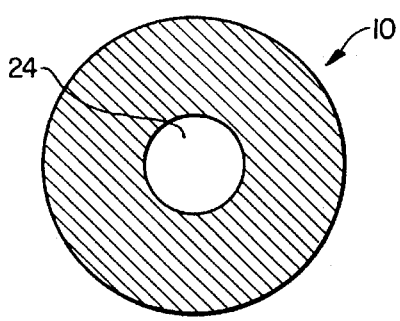
FIG. 1G   FIG. 1H

DIVERTER, DIVERTER RETRIEVING AND RUNNING TOOL AND METHOD FOR RUNNING AND RETRIEVING A DIVERTER

CROSS-REFERENCE TO RELATED APPLICATION

This is a continuation-in-part of Ser. No. 08/296,941, filed on Aug. 26, 1994, entitled "Improved Methods and Systems for Subterranean Multilateral Well Drilling and Completion," commonly assigned with the present invention and incorporated herein by reference.

TECHNICAL FIELD OF THE INVENTION

The present invention is directed, in general, to well drilling and completion and more specifically an improved diverter, diverter retrieving and running tool and methods for running and retrieving a diverter.

BACKGROUND OF THE INVENTION

Horizontal well drilling and production have become increasingly important to the oil industry in recent years. While horizontal wells have been known for many years, only relatively recently have such wells been determined to be a cost-effective alternative to conventional vertical well drilling. Although drilling a horizontal well costs substantially more than its vertical counterpart, a horizontal well frequently improves production by a factor of five, ten or even twenty in naturally-fractured reservoirs. Generally, projected productivity from a horizontal wellbore must triple that of a vertical wellbore for horizontal drilling to be economical. This increased production minimizes the number of platforms, cutting investment and operational costs. Horizontal drilling makes reservoirs in urban areas, permafrost zones and deep offshore waters more accessible. Other applications for horizontal wellbores include periphery wells, thin reservoirs that would require too many vertical wellbores, and reservoirs with coning problems in which a horizontal wellbore could be optimally distanced from the fluid contact.

Also, some horizontal wellbores contain additional wellbores extending laterally from the primary vertical wellbores. These additional lateral wellbores are sometimes referred to as drainholes and vertical wellbores containing more than one lateral wellbore are referred to as multilateral wells. Multilateral wells are becoming increasingly important, both from the standpoint of new drilling operations and from the increasingly important standpoint of reworking existing wellbores, including remedial and stimulation work.

As a result of the foregoing increased dependence on and importance of horizontal wells, horizontal well completion, and particularly multilateral well completion, have been important concerns and continue to provide a host of difficult problems to overcome. Lateral completion, particularly at the juncture between the main and lateral wellbores, is extremely important to avoid collapse of the wellbore in unconsolidated or weakly consolidated formations. Thus, open hole completions are limited to competent rock formations; and, even then, open hole completions are inadequate since there is no control or ability to access (or reenter the lateral) or to isolate production zones within the wellbore. Coupled with this need to complete lateral wellbores is the growing desire to maintain the lateral wellbore size as close as possible to the size of the primary vertical wellbore for ease of drilling and completion.

The above concerns can be summarized in three main objectives: connectivity, isolation and access. Connectivity refers to the mechanical coupling of casings in the main and lateral wellbores such that there are no open holes between casings. This ensures that the multilateral completion is not subject to collapse of a section of open hole and that open hole tools are not required to access portions of the completion.

Isolation refers to the ability to seal off one or more wellbores, or any selectable portion thereof, without impeding production from remaining wellbores or portions. To isolate one wellbore from another effectively, the casings in the wellbores must be hydraulically sealed (generally up to 5000 psi) to one another to allow the multilateral completion as a whole to withstand hydraulic pressure. Hydraulic sealing is particularly important at the juncture between main and lateral wellbores. Without hydraulic sealing, either pressure is lost into the void that surrounds the casing or fluid or particulate contaminates are allowed to enter the casing from the surrounding void. While connectivity, isolation and access are important in both horizontal and vertical wells, they are particularly important and pose particularly difficult problems in multilateral well completions. As mentioned above, isolating one lateral wellbore from other lateral wellbores is necessary to prevent migration of fluids and to comply with completion practices and regulations regarding the separate production of different production zones. Zonal (or partial wellbore) isolation may also be needed if the wellbore drifts in and out of the target reservoir because of insufficient geological knowledge or poor directional control. When horizontal wellbores are drilled in naturally-fractured reservoirs, zonal isolation is seen as desirable. Initial pressure in naturally-fractured formations may vary from one fracture to the next, as may the hydrocarbon gravity and likelihood of coning. Allowing the formations to produce together permits crossflow between fractures. A single fracture with early water breakthrough may jeopardize the entire well's production.

Access refers to the ability to reenter a selected one of the wellbores to perform completion work, additional drilling or remedial and stimulation work, preferably without requiring a full drilling rig. In the most preferable situation, any one of the lateral wellbores can be entered using coiled tubing, thereby saving money.

There have been several prior art techniques of completing multilateral wells using open-hole completion techniques. One involves the drilling of a single main wellbore and one or more lateral wellbores emanating from a base portion thereof. The main wellbore is cased except for the base portion. The base portion and the one or more lateral wellbores are left open-hole. Although this completion technique is relatively inexpensive, not one of the above three main objectives (connectivity, isolation and access) is satisfied, as there are portions of the wellbores left open-hole, the open-hole wellbores cannot be selectively sealed off, except to a limited degree with open-hole isolation tools and access to the lateral wellbores can only be by way of bent subs or orientation devices. Apart from the three main objectives, if one of the lateral wellbores collapses or becomes clogged, the entire well is threatened.

Another prior art completion technique calls for the drilling of one or more open hole lateral wellbores from a main wellbore. A special casing having a number of inflatable open-hole packers and perforations between the inflatable packers is placed in the main wellbore. The inflatable packers serve to separate the lateral wellbores hydraulically from one another. This technique therefore offers a degree of isolation, in that an entire lateral can be sealed off from the rest. However, portions of a lateral cannot be sealed off. Further, there is neither connectivity nor access. Finally, the lateral wellbores are left open-hole. Therefore, if a lateral wellbore collapses or becomes clogged, production from that wellbore is compromised.

Conventionally, some multilateral completion techniques have employed slotted liner completion. The primary purpose of inserting a slotted liner in a lateral wellbores is to guard against hole collapse. Additionally, a liner provides a convenient path to insert various tools such as coiled tubing in the wellbore. Three types of liners have been used, namely: (1) perforated liners, where holes are drilled in the liner, (2) slotted liners, where slots of various width and length are milled along the line length, and (3) prepacked screens.

One prior art completion technique employing liners is similar to the first-described open-hole completion technique, but requires the lateral wellbores to be fitted with liners. However, the liners terminate within the lateral wellbores, resulting in short lateral wellbore sections proximate the main wellbore that are left open-hole. Similarly, the base portion of the main wellbore is left open-hole. Although not as inexpensive as the first-described open-hole technique, this completion technique is still relatively inexpensive. However, none of the above three main objectives is satisfied, as portions of each lateral wellbore and the base portion of the main wellbore are left open-hole. The open-hole wellbores cannot be selectively sealed off, except to a limited degree with open-hole isolation tools. Finally, access to the lateral wellbores can only be by way of bent subs or orientation devices. The sole advantage of this completion technique is that liners provide support as against erosion or collapse in the lateral wellbores.

A second completion technique employing lined laterals involves two lateral wellbores extending from a main wellbore, one over the other, each having a liner and each liner extending back to a casing in the main wellbore. Thus, connectivity is achieved, as the liners are hydraulically sealed to the main wellbore casing. Unfortunately, the lower of the two lateral wellbores cannot be sealed off (isolated). Further, the lower of the two lateral wellbores cannot be accessed subsequently. Thus, only one of the three principal objectives is met.

A third completion technique employing lined laterals is reserved for new well completion and involves the drilling of multiple lateral wellbores from a main wellbore. A liner is inserted into the main wellbore. The liner is provided with windows therein corresponding to the position of the laterals. Thus, the main wellbore liner must be oriented when it is inserted. Next, liners are inserted into the lateral wellbores. The open ends of the lateral wellbore liners extend through the windows of the main wellbore liner. This technique is designed for new wells, because the location and orientation of the lateral wellbores must be prearranged. Applying the three main objectives, connectivity is not present, since the lateral wellbore liners are not sealed to the main wellbore liner. Isolation is possible, but access to the lateral wellbores for the purpose of reworking or isolating a lateral wellbore must be made by way of bent subs or orientation devices.

One further prior art completion technique does not involve either open-hole or lined lateral wellbores. This technique requires the drilling of a relatively large main wellbore. Multiple lateral wellbores are drilled in parallel through the bottom of the main wellbore and spread in separate directions. The main and lateral wellbores are cased and sealed together. All three of the three main objectives are met, as isolation of and access to each lateral wellbore are provided. However, in most cases, only two or three lateral wellbores are allowed, as the cross-sectional areas of the lateral wellbores must fit within the cross-sectional area of the main wellbore. This severely limits the cost effectiveness of the well as a whole, as the main wellbore must be of exceptionally large diameter and thus relatively expensive to drill.

The problem of lateral wellbore (and particularly multi-lateral wellbore) completion has been recognized for many years as reflected in the patent literature, For example, U.S. Pat. No. 4,807,704 discloses a system for completing multiple lateral wellbores using a dual packer and a deflective guide member. U.S. Pat. No. 2,797,893 discloses a method for completing lateral wells using a flexible liner and deflecting tool. U.S. Pat. No. 2,397,070 similarly describes lateral wellbore completion using flexible casing together with a closure shield for closing off the lateral. In U.S. Pat. No. 2,858,107, a removable whipstock assembly provides a means for locating (e.g., accessing) a lateral subsequent to completion thereof. U.S. Pat. No. 3,330,349 discloses a mandrel for guiding and completing multiple horizontal wells. U.S. Pat. Nos. 4,396,075; 4,415,205; 4,444,276 and 4,573,541 all relate generally to methods and devices for multilateral completions using a template or tube guide head. Other patents of general interest in the field of horizontal well completion include U.S. Pat. Nos. 2,452,920 and 4,402,551.

Notwithstanding the above-described attempts at obtaining cost-effective and workable lateral well completion, there continues to be a need for new and improved methods and devices for providing such completions, particularly sealing between the juncture of vertical and lateral wells, the ability to access lateral wells (particularly in multilateral systems) and achieving zone isolation between respective lateral wells in a multilateral well system.

There is also a need for gaining economy in lateral well completions. Toward this end, it is highly advantageous to minimize the number of trips necessary to drill and complete a lateral wellbore.

Ser. No. 08/296,941, initially referenced above, discloses several methods and systems for subterranean multilateral well drilling and completion. Of two main embodiments of such methods and systems, the latter, in a preferred embodiment, employs a drillable composite joint or liner that extends from the main borehole and through a window in the main borehole into the lateral borehole. In place, the liner blocks a lower portion of the main borehole. After being cemented into place, a portion of the liner must be removed, preferably by drilling through the portion with an ordinary rock bit, to reopen the lower portion of the main borehole. Once the lower portion of the main borehole is reestablished, the well is essentially complete, save for optional placement of flow control apparati or other devices.

Over time, it may become necessary to reenter a selected one of the lateral boreholes for rework or other purposes. To this end, the prior art has provided diverters that may be placed within and removed from the main borehole as desired. However, some significant disadvantages are associated with such prior art diverters.

First, the topography of the main well flow conductor, particularly at the junction between the main and lateral boreholes, is often unknown and subject to variation. The tools designed to enter the lateral well flow conductor may have a relatively large diameter, that is, just slightly smaller than that of the main well flow conductor so that there are close tolerances between the two. Thus, there is little room for movement of the tool within the main well flow conductor in the event that there is a defect or protrusion above or at the junction that serves to decrease the effective diameter of the main well flow conductor. In this case, the tool may become lodged in the well bore at the obstruction. Such defects arise, for instance, when the window at the junction of the main and lateral boreholes is malformed. This may result in tools not being able to get through the window to the lateral well flow conductor. Prior art diverters are rigid; thus, such diverters are unable to adjust dynamically or compensate for deviations or malformations.

Second, retrieving such prior art diverters is difficult. Prior art retrieval was generally by one of two methods. The first employs an overshot to engage an outer diameter of the diverter. Unfortunately, the diverter may not be centralized, making it difficult for the overshot to fit around the diverter. The second employs a retriever designed to engage a specific coupling point on the face of the diverter. Unfortunately, such retrieving tools must first be oriented with respect to the diverter, else they fail to engage and retrieve. This is unnecessarily complicated and may require multiple trips should the orientation of the retrieving tool be incorrect.

Therefore, there is a need in the art for an improved diverter, retrieval tool and methods for diverting and retrieving that take into account possible fluctuations in well flow conductor diameter and that simplify and render diverter retrieval more reliable than in the prior art.

SUMMARY OF THE INVENTION

To address the above-discussed deficiencies of the prior art, it is a primary object of the present invention to provide a diverter that has a compliant diverter surface thereon, allowing the diverter to adjust or compensate for deviations in the main borehole, junction or lateral borehole that would pose an obstacle to passage of the tool if the diverter surface were not compliant.

In the attainment of the primary object, the present invention provides a diverter for a subterranean well, a diverter retrieving tool and methods of diverting objects traversing the well and retrieving the diverter. In a first aspect, the present invention provides a diverter comprising: (1) a body having a lower portion adapted to be coupled to a diverter anchoring structure and an upper portion having a slanted diverting surface, the diverter adapted to be placed within a main borehole of the subterranean well at a predetermined location and orientation proximate a junction of a lateral borehole with the main borehole, the slanted diverting surface adapted to redirect an object having a particular diameter and coming into contact with the diverter into the lateral borehole and (2) a compliant spring member associated with the slanted diverter surface, the spring member resiliently retractable toward the slanted diverter surface to allow the object to traverse the junction and enter the lateral borehole, the diverter therefore dynamically adjustable to compensate for an insufficient minimum diameter of a selectable one of the main borehole, junction and lateral borehole.

Thus, it can be seen that the diverter employs a spring member to urge against any object (such as a tool) that may come into contact with the diverter. If the diameters of the main borehole, junction or lateral boreholes are sufficient to allow the object to pass, the spring member need not comply. However, if the diameters are constricted, perhaps owing to a defect occurring during formation of the junction, the spring member retracts to create the extra diameter needed for the tool to pass the constriction.

In a preferred embodiment of the present invention, the body is composed of a composite material. It is a further, lesser object of the present invention to employ composite materials to advantage wherever possible. Those of skill in the art are familiar with the strength and weight advantages of composite structures. The present invention, in this preferred embodiment, takes advantage of these advantages. It should be understood, however, that a diverter composed of a metallic or a non-metallic, non-composite material is also within the scope of the present invention.

In a preferred embodiment of the present invention, the diverter further comprises a second compliant spring member associated with the slanted diverter surface. The compliant spring members cooperate to allow the object to traverse the junction and enter the lateral borehole.

Thus, the present invention contemplates multiple compliant spring members. As will be described, the spring members may be in a longitudinally or laterally spaced-apart configuration. In the illustrated embodiment, there are three spring members, arranged at two longitudinally spaced-apart locations. At the upper location, two springs are paired. At the lower location, there is a single spring. In a manner to be described, this arrangement has the further advantage of allowing the retrieving tool to engage the diverter.

In a preferred embodiment of the present invention, the body has a central longitudinal shaft and a dilated opening to the central longitudinal shaft on the slanted diverter surface. The dilated opening is adapted to receive a retrieving tool into the central longitudinal shaft. The retrieving tool engages the body within the central longitudinal shaft to allow the retrieving tool to exert a retrieving force on the body.

Thus, in this preferred embodiment, the diverter is uniquely adapted to receive a centrally-located retriever. This is in contrast to the prior art, wherein a retriever may employ an overshot to engage an outer diameter of the diverter or the retriever, which first requires orientation with respect to the diverter. Once properly oriented, the retriever then engages a coupling point on the face of the diverter.

In a preferred embodiment of the present invention, a segment of the diverter's upper portion has a diameter less than that of the lower portion thereby allowing an overshot associated with a retrieving tool radially to surround the segment. The present invention, in this embodiment, makes use of an overshot to surround the segment of the diverter. However, as opposed to the prior art, the overshot does not engage the diverter to retrieve the same.

In another preferred embodiment of the present invention, the lower portion of the body has threads to receive the diverter anchoring structure, the threads being shearable upon application of a predetermined separating force to separate the body from the diverter anchoring structure. Thus, if the diverter anchoring structure is irretrievably retained within the main borehole, the diverter may be separated therefrom by stripping the threads.

In another aspect of a preferred embodiment of the present invention, the diverter anchoring structure comprises a locating key for engaging the anchoring structure at the predetermined location within the main borehole. The locating key has a profile adapted to engage a nipple on an inner diameter of the main borehole. Those of skill in the art are familiar with such locating keys and their function.

In yet another aspect of a preferred embodiment of the present invention, the diverter anchoring structure comprises an orienting lug for engaging the anchoring structure at the predetermined orientation within the main borehole. The orienting lug, like the locating key, engages a recess in the inner diameter of the main bore. The recess is oriented, thereby orienting the diverter toward the lateral borehole.

In a preferred embodiment of the present invention, the diverter has an interface associated therewith for receiving an elongated portion of a retrieving tool. The elongated portion has a shearable section to allow the elongated portion to separate from a remainder of the retrieving tool upon application of a predetermined separating force. Thus, should the diverter be stuck within the main borehole, the retrieving tool can be separated therefrom upon application of the predetermined separating force.

In a preferred embodiment of the present invention, the compliant spring member is a leaf spring having first and second ends slidably captured within the upper portion of the body and a middle arcuate section of the leaf spring extending from the slanted diverting surface resiliently to contact and divert the object.

Those of skill in the art should understand that, while a leaf spring is well suited to perform the task of adjusting for deviations in main borehole, junction or lateral borehole diameter, other well-known springs may be suitable in certain applications. Further, a surface constructed of a compliant material, such as a rubber or foam, may be appropriate. All such compliant spring members are within the scope of the present invention.

In a second aspect, the present invention provides a retrieving tool for a diverter wherein the diverter includes a body having a slanted diverting surface and a central longitudinal shaft associated therewith, the retrieving tool comprising: (1) a housing having a predetermined diameter and adapted to traverse a length of a main well flow conductor and (2) an elongated flexible finger having an interface end coupled to the housing and a distal bulbous end, the housing substantially centralizing the bulbous end with respect to the main well flow conductor, the bulbous end adapted to contact the slanted diverting surface and enter the central longitudinal shaft as the retrieving tool merges with the diverter, the bulbous end adapted to engage the body within the central longitudinal shaft as the retrieving tool is drawn away from the diverter, the elongated flexible finger capable of transmitting a retrieving force to the diverter to displace the diverter longitudinally within the main borehole.

Thus, in this aspect of the present invention, the retrieval tool reaches into the diverter to grasp the diverter from within. This is as opposed to the prior art methods of grasping the diverter from without or grasping the diverter at a prescribed location on the diverter face, therefore requiring that the retrieving tool be pre-oriented.

In this preferred embodiment, the elongated flexible finger is composed of a composite material, wherein the bulbous end is able to deviate from a centerline of the main well flow conductor as the elongated flexible finger flexes. Again, composite structures possess distinct weight and strength advantages that are outside of the scope of the present discussion. In a manner to be illustrated, the bulbous end moves from the centerline as it traverses the slanted diverting surface. Eventually, the bulbous end snaps back toward the centerline when it reaches a dilated opening in the slanted diverting face. This places the bulbous end within the diverter and in position to engage and retrieve the diverter.

In a preferred embodiment of the present invention, the housing has an overshot portion radially surrounding the elongated finger member, the overshot portion substantially centralizing the elongated flexible finger with respect to the main well flow conductor, thereby eliminating a need to radially orient the retrieving tool with respect to the slanted diverting surface. As just described, the slanted diverting face decentralizes the bulbous end of the flexible finger which has at least partially rounded ends. Thus, in effect, the diverter itself "orients" the retrieving tool, although the tool itself never has to be rotated during this "orientation." The overshot portion not only centralizes the flexible finger, but also protects the flexible finger from damage or unintended engagement with the main well flow conductor as the retrieving tool is lowered into place. This can be contrasted to prior retrieving tools having hook like structure that must be specifically oriented for engagement.

In a preferred embodiment of the present invention, the diverter comprises a pair of compliant spring members associated with the slanted diverting face, the bulbous end traversing the slanted diverting surface between the compliant spring members. As will be illustrated, the compliant spring members are placed on either side of a track formed in the slanted diverting surface. The bulbous end rides in the track until it drops into the dilated opening. This interaction is at least partially facilitated by the characteristics of the composite material from which the finger member is constructed. However, it is contemplated that the finger member could be constructed from other suitable material.

In a preferred embodiment of the present invention, the body further has a dilated opening to the central longitudinal shaft on the slanted diverter surface, a diameter of the central longitudinal shaft decreasing to form a receiving pocket proximate the dilated opening, the dilated opening adapted to receive the retrieving tool into the central longitudinal shaft, the retrieving tool entering the pocket and engaging the body to allow the retrieving tool to exert the retrieving force on the body. This is as previously described.

In a preferred embodiment of the present invention, the elongated portion has a shearable section to allow the elongated portion to separate from a remainder of the retrieving tool upon application of a predetermined separating force. Again, should the elongated portion become stuck in the diverter, the separating force can be applied to remove the remainder from the diverter.

In a preferred embodiment of the present invention, the elongated flexible finger is removable from the housing, the housing joinable to the diverter by a shear pin thereby to allow the housing to function as a running tool for the diverter. Thus, the retrieving tool can be configured as a diverter running tool by removing the flexible finger, inserting the diverter into the (now running) tool and coupling the two with the shear pin. When the diverter is set into place, a separating force can be employed to shear the shear pin, thereby freeing the running tool.

In a preferred embodiment of the present invention, the slanted diverting surface decentralizes the bulbous end with respect to the main well flow conductor as the bulbous end traverses the slanted diverting surface. This, too, is as described previously.

The present invention further includes methods for diverting objects within the main well flow conductor and for retrieving the diverter.

The foregoing has outlined rather broadly the features and technical advantages of the present invention so that those skilled in the art may better understand the detailed descrip- FIG. 5 illustrates the running tool of FIG. 4 positioned over a diverter.

DETAILED DESCRIPTION

Turning initially to FIGS. 1 and 1A–1H, in a preferred embodiment thereof, there is illustrated a side cross-sectional view of a diverter 10. The diverter 10 is comprised of an elongated body 12 having a lower portion 14 adapted to be coupled to a diverter anchoring structure (not shown) and an upper portion 16 having a slanted diverting surface 18. A segment of the upper portion 16 of the diverter 10 preferably has a diameter less than that of the lower portion 14 thereby allowing an overshot associated with a retrieving tool radially to surround the segment. Preferably, the lower portion 14 of the body 12 has threads 20 to receive a diverter anchoring structure (not shown). The threads 20 are shearable upon application of a predetermined separating force to separate the body 12 from a diverter anchoring structure such as the type disclosed in FIG. 1, reference number 134, in the above cross-referenced pending U.S. application Ser. No. 08/296,941. Thus, if the diverter anchoring structure is irretrievably retained within the main borehole, the diverter 10 may be separated therefrom by stripping the threads 20 and pulling out the diverter 10. This diverter anchoring structure preferably comprises a locating key for engaging the anchoring structure at the predetermined location within the main borehole as disclosed in FIG. 1 of U.S. application Ser. No. 08/296,941. This diverter anchoring structure may further comprise an orienting lug, as disclosed in FIG. 1 of U.S. application Ser. No. 08/296,941, for engaging the anchoring structure at the predetermined orientation within the main borehole. The orienting lug, like the locating key, engages a recess in the inner diameter of the main bore. The recess is oriented, thereby orienting the diverter toward the lateral borehole. The locating key has a profile adapted to engage a nipple on an inner diameter of the main borehole. Those of skill in the art are familiar with such locating keys and their function.

The body 12 has a central longitudinal shaft 22 with a dilated opening 24 to the central longitudinal shaft 22 on the slanted diverting surface 18. The dilated opening 24 is adapted to receive a retrieving tool (not shown) into the central longitudinal shaft 22. The diameter of the dilated opening 24 decreases to form a receiving pocket 24a immediately above the dilated opening 24. The retrieving tool engages the body 12 within the central longitudinal shaft 22 to allow the retrieving tool to exert a retrieving force on the body 12. The body 12 is preferably comprised of a composite material. Those of skill in the art are familiar with the strength and weight advantages of composite structures, which are utilized in the present invention. It should be understood, however, that a diverter composed of a metallic or a non-metallic, non-composite material is also within the scope of the present invention.

The diverter 10 is adapted to be placed within a main borehole (not shown) of a subterranean well at a predetermined location and orientation proximate a junction of a lateral borehole (not shown) with the main borehole. The slanted diverting surface 18 is adapted to redirect an object having a particular diameter and coming into contact with the diverter into the lateral borehole. A compliant spring member 26, which is resiliently retractable toward the slanted diverting surface 18, is slidably secured to the diverter 10. The compliant spring member 26 is preferably comprised of two springs spaced-apart and above a single spring 34 above, longitudinally extending spring members

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates a cross-sectional view of FIG. 1 taken along the line 1A—1A showing the upper portion of the diverter face;

FIG. 1B illustrates a cross-sectional view of FIG. 1 taken along the line 1B—1B showing the upper portion of the diverter face and the concave upper portion of the track in the central longitudinal shaft;

FIG. 1C illustrates a cross-sectional view of FIG. 1 taken along the line 1C—1C showing the compliant spring members and further deepening of the track in central longitudinal shaft;

FIG. 1D illustrates a cross-sectional view of FIG. 1 taken along the line 1D—1D showing further deepening of the track in the central longitudinal shaft;

FIG. 1E illustrates a cross-sectional view of FIG. 1 taken along the line 1E—1E showing the dilated opening in the central longitudinal shaft and the receiving pocket for a retriever;

FIG. 1F illustrates a cross-sectional view of FIG. 1 taken along the line 1F—1F showing complete an opening in the central longitudinal shaft and a second spring member in a lower portion of the diverter;

FIG. 1G illustrates a cross-sectional view of FIG. 1 taken along the line 1G—1G showing the opening in the central longitudinal shaft and the lower end of the diverter face in a lower portion of the diverter; and FIG. 1H illustrates a cross-sectional view of FIG. 1 taken along the line 1H—1H showing the opening in the central longitudinal shaft after which the concave portion of the diverter face has terminated in the lower portion of the diverter;

Figure 1:
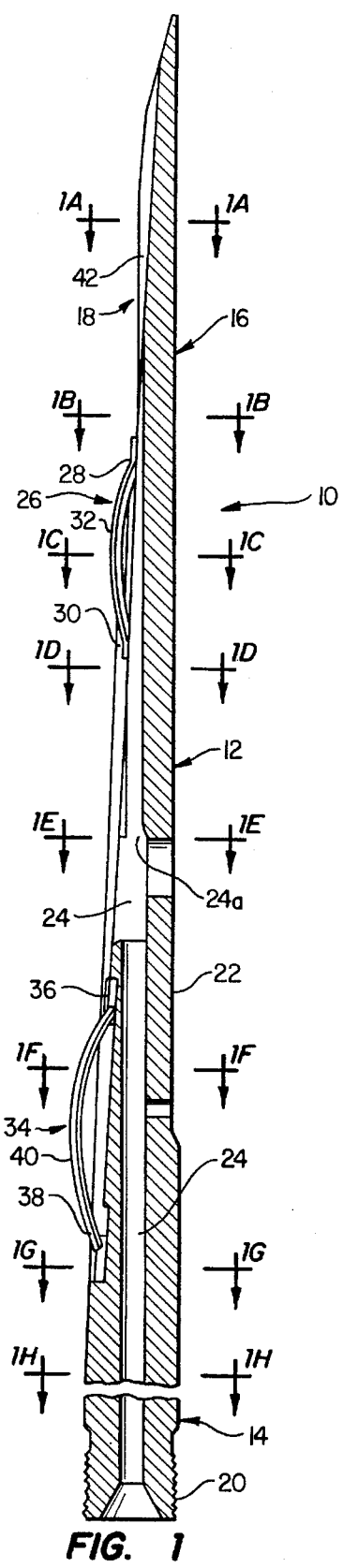
FIG. 1 illustrates a side cross-sectional view of the diverter of the present invention showing the compliant spring members and the central longitudinal shaft with the dilated opening therein.

The diverter 10 may further comprise a second compliant spring member 34 positioned below the compliant spring member 26. As with the compliant spring member 26, the second spring member 34 is also preferably a leaf spring having first and second ends 36,38 slidably captured within the upper portion 16 of the body 12 and having a middle arcuate section 40 of the leaf spring extending from the slanted diverting surface 18 resiliently to contact and divert the object. The compliant spring members 26,34 are positioned within the main borehole and across from the opening to the lateral borehole. Both of these compliant spring members 26,34 cooperate to allow an incoming object to traverse the junction between the main borehole and the lateral borehole, and thus, enter the lateral borehole. As such, these compliant spring members 26,34 offer the advantage of providing a diverter that can dynamically adjust or compensate for deviations that would pose as an obstacle in the main borehole, lateral borehole or the junction therebetween.

Turning now specifically to FIGS. 1A–1H, there is illustrated the slanted diverter surface 18 as seen along the length of a cross-sectional view of the diverter illustrated in FIG. 1. As seen in FIG. 1A, which is, cross-sectioned at the upper portion 16 of the diverter 10, the slanted diverting surface 18 has a gentle concave track 42 formed therein. As seen in the subsequent figures, this concave track 42 extends a length of the diverter 10 to the receiving pocket 24a. The concave track 42 is present in the diverter 10 to act as a guide for a inserted tools, including retrieval tools. The concave track 42 is also illustrated in FIG. 1B. However, the track 42 has a deepened portion 42a therein. The deepened portion 42a traverses the length of the diverter 10 to the point where the receiving pocket 24a is formed. Additionally, as seen from FIGS. 1A–1E, the track 42 and the deepened portion 42a form the diverter surface 18 offset from the center line of the diverter 10. Thus, as the object is being inserted into the main borehole encounters the compliant spring members 26a and 26b, the spring members 26a and 26b resiliently retract to allow the object to move inwardly past the center line of the diverter 10. As discussed below, this offset allows the object past a problem area that may be present in the main borehole.

The pairs of compliant spring members 26a,26b are clearly seen in FIG. 1C. The compliant spring members 26a,26b are laterally separated to provide an opening through which a retrieval tool may pass without engaging the compliant spring members 26a,26b.

The deepened portion 42a is more pronounced in FIG. 1D than in previous figures and shows the configuration of the deepened portion 42a just above the receiving pocket 24a as illustrated in FIG. 1E that is designed to receive an end of a retrieving tool therein. FIG. 1E also illustrates the dilated opening 24 formed immediately below the receiving pocket 24a. The second compliant spring 34 which is lower and laterally spaced apart from the springs 26a and 26b, the concave track 42 and the dilated opening 24 are illustrated in FIG. 1F, and FIGS. 1G–1H simply illustrate the termination of the concave track 42 and the continuation of the dilated opening 24 within the longitudinal shaft 22.

With the diverter 10 having been described, its method of use and operation will now be briefly discussed. The diverter 10 is placed within a main borehole of a subterranean well at a predetermined location and orientation proximate a junction of a lateral borehole with the main borehole. The diverter 10 is positioned and oriented within the main borehole via locating keys or an orientation lug. The lower portion of the body 12 is coupled to a diverter anchoring structure. Once the diverter 10 is correctly positioned and oriented, an object, such as a drilling tool, completion tool or other similar equipment is brought into contact with the slanted diverting surface 18. As the object traverses the slanted diverting surface 18, the object is urged away from the centerline of the diverter 10 by the slope angle of the slanted diverting surface 18. The object then engages the first compliant spring member 26. If the object encounters an obstacle between the main borehole and the diverter 10, such as an irregularity in the surface of the main borehole or the junction itself, a force is directed against the object back toward the centerline of the diverter 10 and against the compliant spring member 26. At this point, in conventional diverter apparatus, the object could be caught or "hung-up" in the main borehole. However, the diverter 10 of the present invention allows the object to pass by the problem area because the compliant spring members 26a,26b that are associated with the slanted diverting surface 18 resiliently retract toward the slanted diverting surface 18 in response to the force to allow the object to traverse the problem area or the junction of the main borehole and the lateral borehole, and thus enter the lateral borehole. As the object proceeds along the slanted diverting surface 18, it encounters the lower second compliant spring member 34 that further urge the object toward the lateral borehole.

Figure 2:
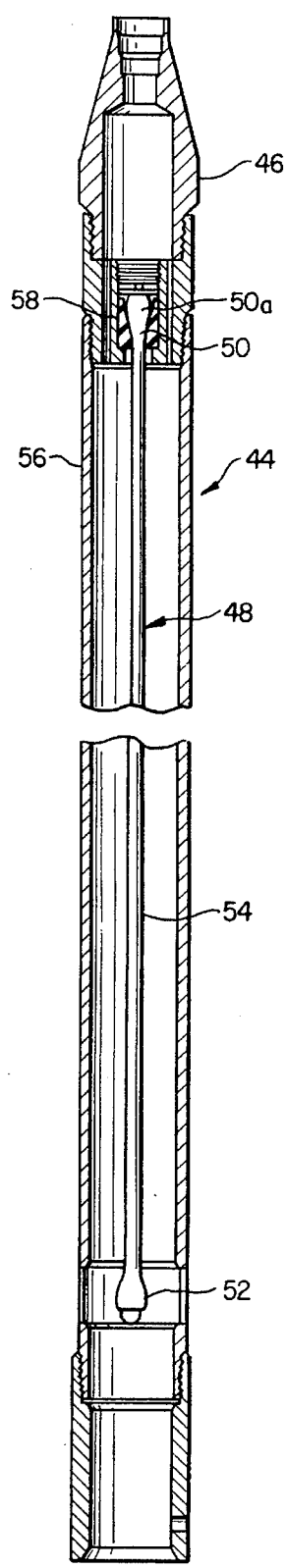
FIG. 2 illustrates a retrieving tool having a housing with a predetermined diameter that is adapted to traverse a length of a main well flow conductor and an elongated flexible finger having a bulbous end adapted to contact a diverter.

Turning now to FIG. 2, there is illustrated a retrieving tool 44 having a housing 46 with a predetermined diameter that is adapted to traverse a length of a main well flow conductor and an elongated flexible finger 48 having an upper end 50, a distal bulbous end 52 and an intermediate elongated portion 54 adapted to contact the diverter 10. The housing 46 preferably has an overshot portion 56 that has an inside diameter sufficient to radially surround the elongated finger member 48, and more preferably, the inside diameter is sufficient to radially surround the diverter 10. The overshot portion 56 substantially centralizes the elongated flexible finger member 48 with respect to the main well flow conductor, thereby eliminating a need to orient the retrieving tool 44 with respect to the slanted diverting surface 18.

The elongated flexible finger member 48 is preferably comprised of a composite material, wherein the distal bulbous end 52 is able to deviate from a centerline of the main well flow conductor as the elongated flexible finger member 48 flexes. Again, those skilled in the art will appreciate the advantages associated with such composite structures. The upper end 50 of the elongated flexible finger member 48, which may also have a bulbous end 50a thereon, is secured within the housing 46 via a securing device 58, which is configured to secure the upper end 50 of the elongated flexible finger member 48. Preferably, the securing device 58 is a material designed to withstand the lifting pressures associated with retrieval operations and has an upper portion configured to the same shape as the upper end 50 of the elongated flexible finger member 48 and is adapted to receive and secure the upper end 50 therein. A lower portion of the securing device 58 is tapered to prevent the upper end 50 of the elongated flexible finger member 48 from passing therethrough.

The elongated flexible finger member 48 preferably has a shearable section positioned immediately below the housing 46 that allows the elongated flexible finger member 48 to shear and separate from a remainder of the retrieving tool 44 upon application of a predetermined separating force. Thus, should the diverter 10 be stuck within the main borehole, the retrieving tool 44 can be separated therefrom upon application of the predetermined separating force. The housing 46 substantially centralizes the distal bulbous end 52 with respect to the main well flow conductor.

Figure 3:
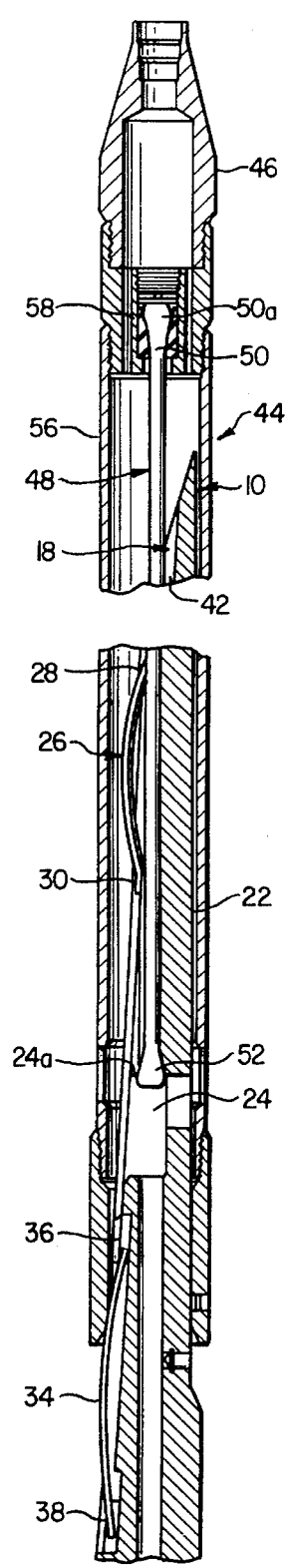
FIG. 3 illustrates the retrieving tool of FIG. 2 with the housing extended over the diverter and with the elongated flexible finger engaged with the diverter for removal for said diverter from a main wellbore.

Turning now to FIG. 3, there is illustrated the retrieving tool 44 of FIG. 2 with the overshot portion 56 of the housing 46 extended over the diverter 10 with the elongated flexible finger member 48 engaged with the diverter 10 for removal of the diverter 10 from a main wellbore. The upper end 50 is securely engaged within the housing 46 and the distal bulbous end 52 is received within the receiving pocket 24a formed within the longitudinal shaft 22 of the diverter 10. As illustrated, the intermediate elongated portion 54 remains within the receiving pocket 24a of the diverter 10. The configuration of the rounded bulbous end 52 is such that once received in the receiving pocket 24a, it is not retractable unless sheared in the manner just discussed. This bulbous configuration of the distal bulbous end 52 allows a lifting force to be exerted against the diverter 10 for removal of the diverter 10 from a main borehole.

With the retrieving tool 44 having been described, its use and method of operation will now be discussed with references to FIGS. 1, 1A–1E, 2 and 3. In some applications, it is desirable to remove the diverter 10 from a main borehole. In such applications, the upper end 50 of the elongated flexible finger member 48 is secured to the securing device 58 within the housing 46 of the retrieving tool 44. The overshot portion 56 is threadedly attached to the housing 46 to complete the retrieving tool 44 and the tool is then lowered into the main borehole to the depth at which the diverter 10 is set. The housing 46 centralizes the elongated flexible finger member 48 with respect to the centerline of the slanted diverting surface 18, thereby eliminating a need to orient the retrieving tool 44 with respect to the slanted diverting surface 18. However, as the elongated flexible finger member 48 traverses the diverter 10, the slanted diverting surface 18 decentralizes the bulbous end 52 of the flexible finger member 48. Thus, the diverter 10 itself "orients" the retrieving tool 44 with respect to the diverter 10, although the retrieving tool 44 never rotates during this "orientation." The overshot portion 56 not only centralizes the flexible finger member 48, but also protects the flexible finger member 48 from damage or unintended engagement with the main well flow conductor as the retrieving tool 44 is lowered into place.

As the diverter 10 is received within the overshot portion 56, the distal bulbous end 52 engages the concave track 42 of the slanted diverting surface 18, which guides the distal bulbous end 52 from the centerline of the diverter 10 and decentralizes the elongated flexible finger member 48. As the distal bulbous end 52 traverses the slanted diverting surface 18, it passes between the laterally spaced-apart compliant spring member 26, and thus does not engage the compliant spring member 26. As the elongated flexible finger member 48 continues to traverse the slanted diverting surface 18, it is flexed as a result of the angle of contact with and decentralization from the centerline of the slanted diverting surface 18. When the bulbous end 52 reaches the dilated opening 24, it snaps back toward the centerline of the slanted diverting surface 18. This places the bulbous end 52 within the diverter 10 and in position to engage and retrieve the diverter 10. As the retrieving tool 44 is drawn away from the diverter 10, the bulbous end 52 is received and captured in the retrieving pocket 24a, and the elongated flexible finger member 48 transmits a retrieving force to the diverter 10 to displace it longitudinally within the main borehole.

In the event that the diverter 10 becomes stuck in the main borehole, the housing 46 and the overshot portion 56 may still be removed by applying enough lifting force to shear the elongated flexible finger member 48. Alternatively, the diverter 10 may still be removed by applying enough lifting force to shear the threads 20 (FIG. 1) at the lower end of the diverter 10 and thereby release it from the anchoring structure. It will, of course, be appreciated that the elongated flexible finger member 48 and the shearing threads 20 may be engineered to shear at different shearing forces to provide alternate methods for removing the diverter 10 from the main borehole. If the diverter 10 is permanently stuck in the borehole, it may be drilled out as a last resort.

Thus, in this aspect of the present invention, the retrieval tool 44 reaches into the diverter 10 to grasp the diverter 10 from within. As previously mentioned, this is as opposed to the prior art methods of grasping the diverter from without or grasping the diverter at a prescribed location on the diverter face, therefore requiring that the retrieving tool be pre-oriented.

Figure 4:
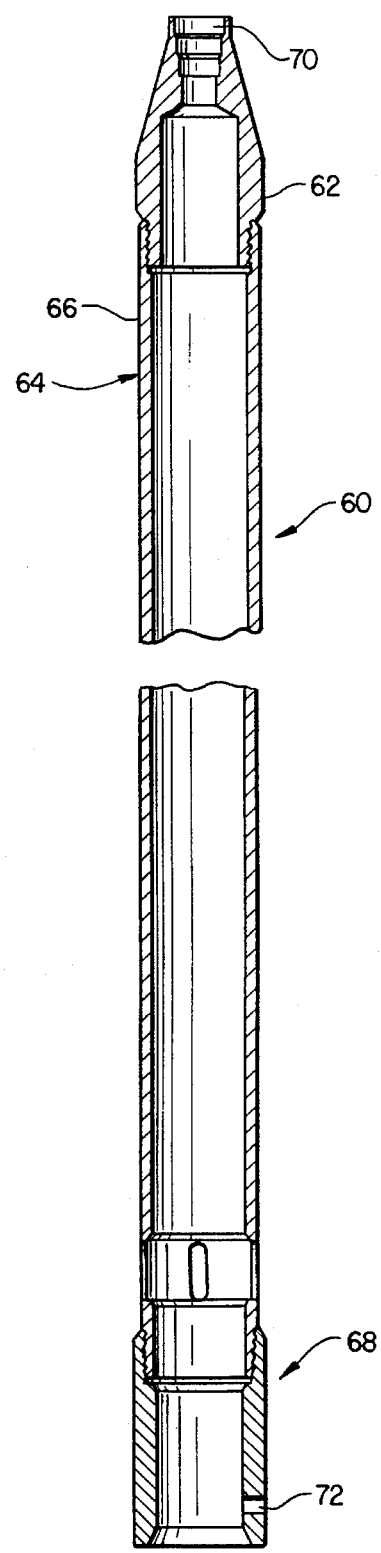
FIG. 4 illustrates the retrieving tool of FIG. 2 adapted as a running tool for a diverter with the running tool having a housing and an elongated overshot portion extending longitudinally therefrom; and 26a,26b (FIG. 1C). The compliant spring member 26 is preferably a leaf spring having first and second ends 28,30 slidably captured within the upper portion 16 of the body 12 and a middle arcuate section 32 of the leaf spring extending from the slanted diverting surface 18 resiliently to contact and divert the object.

Turning now to FIG. 4, there is illustrated the retrieving tool 44 of FIG. 2 adapted to function as a running tool 60 for the diverter 10. The elongated flexible finger has been removed, and the housing 62 has been modified by removing the securing structure therefrom. The running tool 60 has a housing 62 and an elongated overshot portion 64 extending longitudinally therefrom having an upper end 66 and a lower end 68. The housing 62 has a threaded upper portion 70 that is configured to threadedly receive a running string to lower the running tool 60 to the desired depth. Additionally, the overshot portion 64 has an inside diameter that is sufficient to radially surround the outer diameter of the diverter. The lower end 68 of the running tool 60 is provided with an aperture 72 for receiving a shear pin therethrough.

Figure 5:
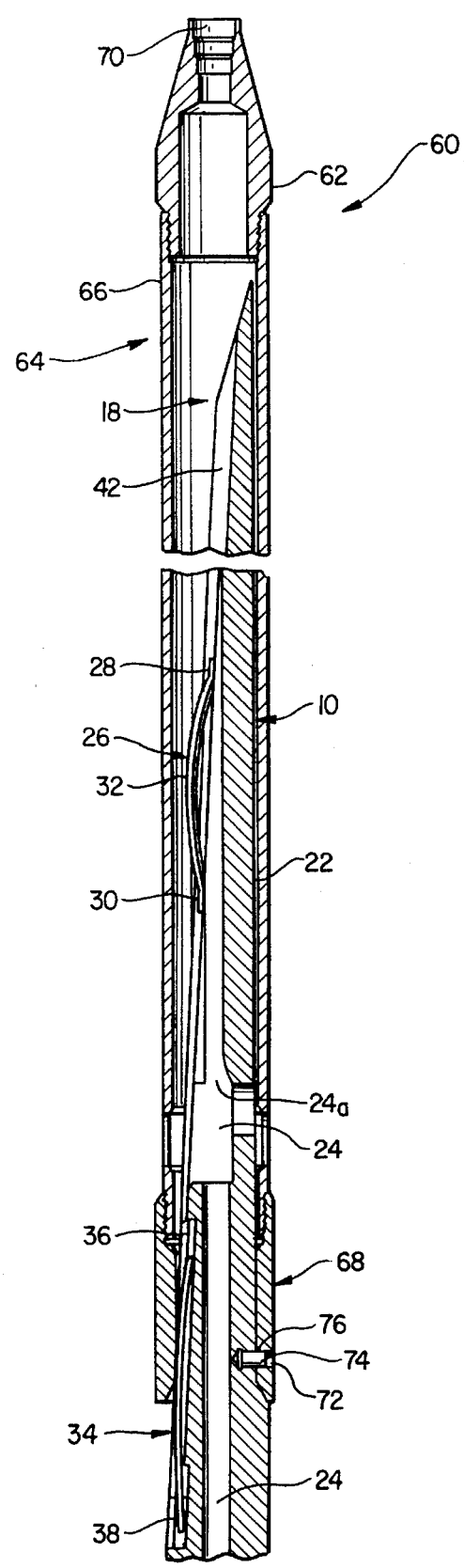

Turning briefly now to FIG. 5, there is illustrated the running tool 60 positioned over the diverter 10. The inside diameter of the overshot portion 64 radially surrounds the diverter 10 and is extended over a length of the diverter 10 to about the mid-point of the second compliant spring member 34. The diverter 10 and the running tool 60 are joined together by a shear pin 74 that extends through the aperture 72 in the running tool 60 and into a shear pin aperture 76 formed in the side of the diverter 10.

With the running tool 60 now having been described, its method of operation and use will be discussed with reference to FIGS. 4 and 5. The running tool 60 is positioned over the diverter 10 on the well's drilling platform or it may be delivered to the drilling sight pre-assembled. In either case, the running tool 60 is secured to the diverter 10 via the shear pin 74. The running tool 60 with the diverter 10 attached is lowered into the main borehole, and the diverter 10 is set in place with the desired orientation. When the diverter 10 is set into place, a separating force is employed by lifting up on the running tool 60 to shear the shear pin 74 and thereby freeing the running tool 60. The running tool 60 is then removed from the main borehole.

From the above, it is apparent that the present invention provides a divefret for a subterranean well, a diverter retrieving tool and methods of diverting objects traversing the well and retrieving the diverter. The diverter comprises: (1) a body having a lower portion adapted to be coupled to a diverter anchoring structure and an upper portion having a slanted diverting surface, the diverter adapted to be placed within a main borehole of the subterranean well at a predetermined location and orientation proximate a junction of a lateral borehole with the main borehole, the slanted diverting surface adapted to redirect an object having a particular diameter and coming into contact with the diverter into the lateral borehole and (2) a compliant spring member associated with the slanted diverter surface. The spring member is resiliently retractable toward the slanted diverter surface to allow the object to traverse the junction and enter the lateral borehole, the diverter therefore dynamically adjustable to compensate for an insufficient minimum diameter of a selectable one of the main borehole, junction and lateral borehole.

Although the present invention and its advantages have been described in detail, those skilled in the art should understand that they can make various changes, substitutions and alterations herein without departing from the spirit and scope of the invention in its broadest form.

What is claimed is:

1. A diverter for a subterranean well, comprising:

a body having a lower portion adapted to be coupled to a diverter anchoring structure and an upper portion having a slanted diverting surface, said diverter adapted to be placed within a main borehole of said subterranean well at a predetermined location and orientation proximate a junction of a lateral borehole with said main borehole, said slanted diverting surface adapted to redirect an object having a particular diameter and coming into contact with said diverter into said lateral borehole; and a compliant spring member associated with said slanted diverter surface, said spring member resiliently retractable toward said slanted diverter surface to allow said object to traverse said junction and enter said lateral borehole, said diverter therefore dynamically adjustable to compensate for an insufficient minimum diameter of a selectable one of said main borehole, junction and lateral borehole.

2. The diverter as recited in claim 1 wherein said body is composed of a composite material.

3. The diverter as recited in claim 1 further comprising a second compliant spring member associated with said slanted diverter surface, said compliant spring members cooperating to allow said object to traverse said junction and enter said lateral borehole.

4. The diverter as recited in claim 1 wherein said body has a central longitudinal shaft and a dilated opening to said central longitudinal shaft on said slanted diverter surface, said dilated opening adapted to receive a retrieving tool into said central longitudinal shaft, said retrieving tool engaging said body within said central longitudinal shaft to allow said retrieving tool to exert a retrieving force on said body.

5. The diverter as recited in claim 1 wherein a segment of said upper portion has a diameter less than that of said lower portion thereby to allow an overshot associated with a retrieving tool radially to surround said segment.

6. The diverter as recited in claim 1 wherein said lower portion of said body has threads to receive said diverter anchoring structure, said threads being shearable upon application of a predetermined separating force to separate said body from said diverter anchoring structure.

7. The diverter as recited in claim 1 wherein said diverter anchoring structure comprises a locating key for engaging said anchoring structure at said predetermined location within said main borehole.

8. The diverter as recited in claim 1 wherein said diverter anchoring structure comprises an orienting lug for engaging said anchoring structure at said predetermined orientation within said main borehole.

9. The diverter as recited in claim 1 wherein said diverter has an interface associated therewith for receiving an elongated portion of a retrieving tool, said elongated portion having a shearable section to allow said elongated portion to separate from a remainder of said retrieving tool upon application of a predetermined separating force.

10. The diverter as recited in claim 1 wherein said compliant spring member is a leaf spring having first and second ends slidably captured within said upper portion of said body, a middle arcuate section of said leaf spring extending from said slanted diverting surface resiliently to contact and divert said object.

11. A method of diverting an object within a subterranean well, comprising the steps of:

placing said diverter within a main borehole of said subterranean well at a predetermined location and orientation proximate a junction of a lateral borehole with said main borehole, said diverter having a body having a lower portion adapted to be coupled to a diverter anchoring structure and an upper portion having a slanted diverting surface, said slanted diverting surface adapted to redirect said object having a particular diameter and coming into contact with said diverter into said lateral borehole; and bringing said object into contact with said diverter, a compliant spring member associated with said slanted diverter surface resiliently retracting toward said slanted diverter surface to allow said object to traverse said junction and enter said lateral borehole, said diverter therefore dynamically adjusting to compensate for an insufficient minimum diameter of a selectable one of said main borehole, junction and lateral borehole.

12. The method as recited in claim 11 wherein said body is composed of a composite material.

13. The method as recited in claim 11 further comprising the step of compliantly retracting a second compliant spring member associated with said slanted diverter surface toward said slanted diverter surface, said compliant spring members cooperating to allow said object to traverse said junction and enter said lateral borehole.

14. The method as recited in claim 11 wherein said body has a central longitudinal shaft and a dilated opening to said central longitudinal shaft on said slanted diverter surface, said method further comprising the step of receiving a retrieving tool into said central longitudinal shaft via said dilated opening, said retrieving tool engaging said body within said central longitudinal shaft to allow said retrieving tool to exert a retrieving force on said body.

15. The method as recited in claim 11 wherein a segment of said upper portion has a diameter less than that of said lower portion, said method further comprising the step of allowing an overshot associated with a retrieving tool radially to surround said segment.

16. The method as recited in claim 11 wherein said lower portion of said body has threads to receive said diverter anchoring structure, said method further comprising the step of shearing said threads upon application of a predetermined separating force to separate said body from said diverter anchoring structure.

17. The method as recited in claim 11 wherein said diverter anchoring structure comprises a locating key, said method further comprising the step of engaging said anchoring structure at said predetermined location within said main borehole with said locating key.

18. The method as recited in claim 11 wherein said diverter anchoring structure comprises an orienting lug, said method further comprising the step of engaging said anchoring structure at said predetermined orientation within said main borehole with said orienting lug.

19. The method as recited in claim 11 wherein said diverter has an interface associated therewith for receiving an elongated portion of a retrieving tool, said elongated portion having a shearable section, said method further comprising the step of allowing said elongated portion to separate from a remainder of said retrieving tool upon application of a predetermined separating force.

20. The method as recited in claim 11 wherein said compliant spring member is a leaf spring having first and second ends slidably captured within said upper portion of said body, said method further comprising the step of resiliently contacting and diverting said object with a middle arcuate section of said leaf spring extending from said slanted diverting surface.

21. A retrieving tool for a diverter, said diverter including a body having a slanted diverting surface and a central longitudinal shaft associated therewith, said retrieving tool comprising:

a housing having a predetermined diameter and adapted to traverse a length of a main well flow conductor; and an elongated flexible finger having an interface end coupled to said housing and a distal bulbous end, said housing substantially centralizing said bulbous end with respect to said main well flow conductor, said bulbous end adapted to contact said slanted diverting surface and enter said central longitudinal shaft as said retrieving tool merges with said diverter, said bulbous end adapted to engage said body within said central longitudinal shaft as said retrieving tool is drawn away from said diverter, said elongated flexible finger capable of transmitting a retrieving force to said diverter to displace said diverter longitudinally within said main borehole.

22. The retrieving tool as recited in claim 21 wherein said elongated flexible finger is composed of a composite material, said bulbous end able to deviate from a centerline of said main well flow conductor as said elongated flexible finger flexes.

23. The retrieving tool as recited in claim 21 wherein said housing has an overshot portion radially surrounding said elongated finger member, said overshot portion substantially centralizing said elongated flexible finger with respect to said main well flow conductor, thereby eliminating a need to orient said retrieving tool with respect to said slanted diverting surface.

24. The retrieving tool as recited in claim 21 wherein said body is composed of a composite material.

25. The retrieving tool as recited in claim 21 wherein said diverter comprises a pair of compliant spring members associated with said slanted diverting face, said bulbous end traversing said slanted diverting surface between said compliant spring members.

26. The retrieving tool as recited in claim 21 wherein said body further has a dilated opening to said central longitudinal shaft on said slanted diverter surface, a diameter of said central longitudinal shaft decreasing to form a receiving pocket proximate said dilated opening, said dilated opening adapted to receive said retrieving tool into said central longitudinal shaft, said retrieving tool entering said pocket and engaging said body to allow said retrieving tool to exert said retrieving force on said body.

27. The retrieving tool as recited in claim 21 wherein a segment of said body has a diameter less than that of a lower portion thereof to allow said housing radially to surround said segment.

28. The retrieving tool as recited in claim 21 wherein said elongated portion has a shearable section to allow said elongated portion to separate from a remainder of said retrieving tool upon application of a predetermined separating force.

29. The retrieving tool as recited in claim 21 wherein said elongated flexible finger is removable from said housing, said housing joinable to said diverter by a shear pin thereby to allow said housing to function as a running tool for said diverter.

30. The retrieving tool as recited in claim 21 wherein said slanted diverting surface decentralizes said bulbous end with respect to said main well flow conductor as said bulbous end traverses said slanted diverting surface.

31. A method of retrieving a diverter, said diverter including a body having a slanted diverting surface and a central longitudinal shaft associated therewith, said method comprising the steps of:

traversing a length of a main well flow conductor with a housing having a predetermined diameter; and contacting said slanted diverting surface with a distal bulbous end of an elongated flexible finger, said elongated flexible finger having an interface end coupled to said housing, said housing substantially centralizing said bulbous end with respect to said main well flow conductor, said bulbous end entering said central longitudinal shaft as said retrieving tool merges with said diverter, said bulbous end adapted to engage said body within said central longitudinal shaft as said retrieving tool is drawn away from said diverter, said elongated flexible finger capable of transmitting a retrieving force to said diverter to displace said diverter longitudinally within said main borehole.

32. The method as recited in claim 31 wherein said elongated flexible finger is composed of a composite material, said method comprising the step of deviating said bulbous end from a centerline of said main well flow conductor as said elongated flexible finger flexes.

33. The method as recited in claim 31 wherein said housing has an overshot portion radially surrounding said elongated finger member, said method comprising the step of substantially centralizing said elongated flexible finger with respect to said main well flow conductor with said overshot portion, thereby eliminating a need to orient said retrieving tool with respect to said slanted diverting surface.

34. The method as recited in claim 31 wherein said body is composed of a composite material.

35. The method as recited in claim 31 wherein said diverter comprises a pair of compliant spring members associated with said slanted diverting face, said method comprising the step of traversing said slanted diverting surface between said compliant spring members with said bulbous end.

36. The method as recited in claim 31 wherein said body further has a dilated opening to said central longitudinal shaft on said slanted diverter surface, a diameter of said central longitudinal shaft decreasing to form a receiving pocket proximate said dilated opening, said method comprising the step of receiving said retrieving tool into said central longitudinal shaft via said dilated opening, said retrieving tool entering said pocket and engaging said body to allow said retrieving tool to exert said retrieving force on said body.

37. The method as recited in claim 31 further wherein a segment of said body has a diameter less than that of a lower portion thereof, said method comprising the step of radially surrounding said segment with said housing.

38. The method as recited in claim 31 wherein said elongated portion has a shearable section to allow said elongated portion to separate from a remainder of said retrieving tool upon application of a predetermined separating force.

39. The method as recited in claim 31 wherein said elongated flexible finger is removable from said housing, said method associated with a method of running said diverter, said running method comprising the step of joining said housing to said diverter with a shear pin thereby to allow said housing to serve as a running tool for said diverter.

40. The method as recited in claim 31 further comprising the step of decentralizing said bulbous end with respect to said main well flow conductor with said slanted diverting surface as said bulbous end traverses said slanted diverting surface.

* * * * *